Figure 1:
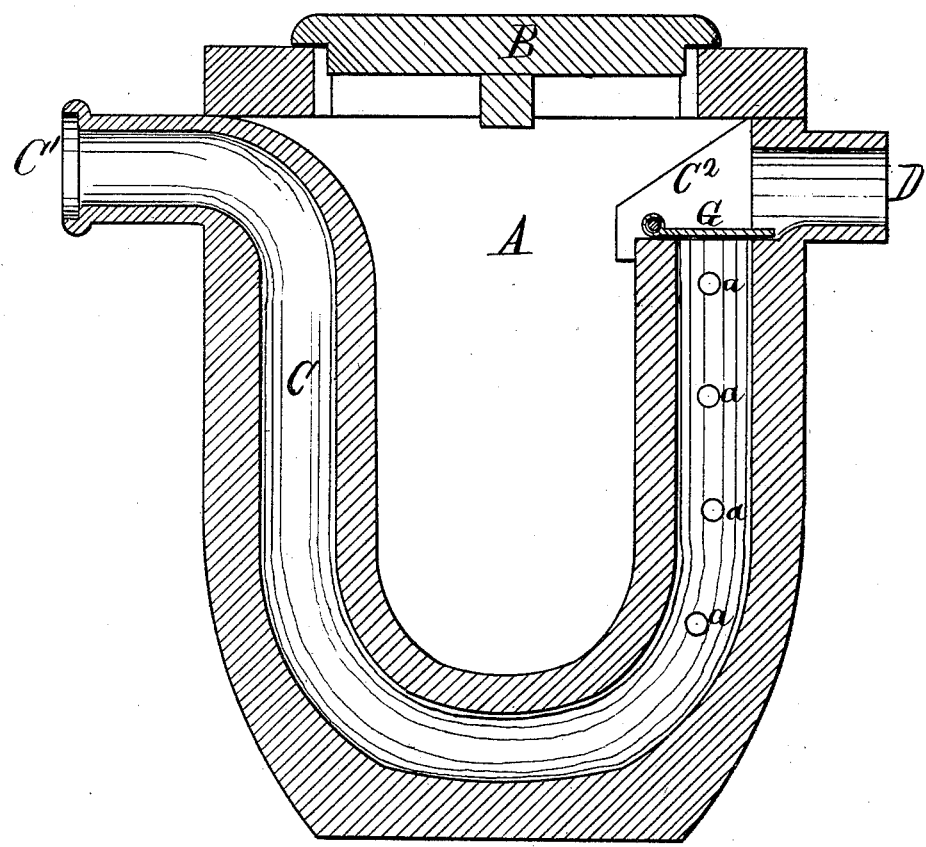

W. BEDELL.
SEWER-TRAP.

No. 175,908. Patented April 11, 1876.

WITNESSES
Thomas Bernard
C. R. Searle

INVENTOR,
William Bedell.
Gilmore & Co.
ATTORNEYS

UNITED STATES PATENT OFFICE.

WILLIAM BEDELL, OF NEW YORK, N. Y.

IMPROVEMENT IN SEWER-TRAPS.

Specification forming part of Letters Patent No. 175,908, dated April 11, 1876; application filed March 11, 1876.

*To all whom it may concern:*

Be it known that I, WILLIAM BEDELL, of New York, in the county of New York and State of New York, have invented a new and valuable Improvement in Sewer-Traps; and I do hereby declare that the following is a full, clear, and exact description of the construction and operation of the same, reference being had to the annexed drawings, making a part of this specification, and to the letters and figures of reference marked thereon.

Figure 1 of the drawings is a representation of a longitudinal vertical section of my sewer-trap.

My invention relates to sewer-traps, and is intended for the exit of all matter that passes to the main sewer from a building, roof, water-closets, &c., in advance of every connection; and it consists in the construction and arrangement of an S-shaped trap, incased in a tank cast solid, with a portion of the trap cut off, and submerged, forming a double trap, perforated, and provided with flood-gate, all as hereinafter more fully set forth.

In the annexed drawings, A represents the the tank, with central hand-hole, and cover B fastened therein in any suitable manner. C is the trap made in S form, $C^1$ being the inlet thereof. The inner end of the trap C is cut off below the outlet D of the tank, and side walls $C^2$ are formed above the cut-off end of the trap connecting the same with the outlet. The entire tank, trap, inlet, outlet, and side walls are cast, molded, or otherwise formed in one piece, of any material deemed suitable for the purpose. Over the inner end of the trap C is pivoted a flood-gate, G, arranged in such a manner that when open it forms with the side walls $C^2$, as it were, a covered passage connecting the trap with the outlet. The end of the trap C with the gate G is below the water-line, and below the flood-gate there are three or four holes, $a\ a$, in the trap to supply the trap from the tank in case of siphoning, and vice versa.

The advantages of this trap are that it will clean itself of sediment and all fibrous matter from the easy curves, all tending to assist with the pressure of water from entrance-pipe to give impetus to exit-pipe. The inner short end of the pipe is for the same purpose, as all substance passes through it, and is with the current naturally forced out; and the flood-gate and side walls prevent paper or any matter from floating back or clogging, but causes it to pass directly out of the exit-pipe.

What I claim as new, and desire to secure by Letters Patent, is—

1. An S-shaped trap, incased in a tank cast solid, and the end of the trap perforated and provided with a flood-gate, as and for the purpose set forth.

2. The combination of the tank A, S-shaped trap C, inlet $C^1$, outlet D, side wall $C^2$, and flood-gate G, all constructed as shown and described, and for the purposes herein set forth.

In testimony that I claim the above, I have hereunto subscribed my name in the presence of two witnesses.

WILLIAM BEDELL.

Witnesses:
JAMES VAN BUREN,
FREEMAN SKINNER.